(12) United States Patent  
Yoshimi (10) Patent No.: US 8,407,452 B2  
(45) Date of Patent: Mar. 26, 2013

(54) PROCESSOR FOR PERFORMING ENCRYPTION MASK PROCESSING USING RANDOMLY GENERATED INSTRUCTIONS AND DATA

(75) Inventor: Koichi Yoshimi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 570 days.

(21) Appl. No.: 12/382,866

(22) Filed: Mar. 25, 2009

(65) Prior Publication Data

US 2009/0327664 A1   Dec. 31, 2009

(30) Foreign Application Priority Data

Jun. 30, 2008   (JP) ................................. 2008-171214

(51) Int. Cl.
*G06F 15/00* (2006.01)
*G06F 21/00* (2006.01)

(52) U.S. Cl. .......................................... 712/36; 713/189

(58) Field of Classification Search ................ 712/17; 380/28

See application file for complete search history.

(56) References Cited

U.S. PATENT DOCUMENTS

| | | | | |
|---|---|---|---|---|
| 6,804,782 | B1* | 10/2004 | Qiu et al. ....................... | 713/194 |
| 6,976,178 | B1* | 12/2005 | Kissell ........................... | 713/300 |
| 7,086,087 | B1 | 8/2006 | Kaminaga et al. | |
| 7,146,006 | B1* | 12/2006 | Coron et al. .................... | 380/29 |
| 7,240,134 | B2* | 7/2007 | Klug et al. ..................... | 710/107 |
| 7,500,112 | B1* | 3/2009 | Wille et al. .................... | 713/194 |
| 2003/0223580 | A1* | 12/2003 | Snell ............................... | 380/28 |
| 2004/0019802 | A1* | 1/2004 | Hartlieb et al. ................ | 713/200 |
| 2004/0105541 | A1* | 6/2004 | Elbe et al. ...................... | 380/28 |
| 2005/0055596 | A1* | 3/2005 | Abe et al. ....................... | 713/500 |
| 2005/0108498 | A1 | 5/2005 | Kaminaga et al. | |
| 2005/0108507 | A1* | 5/2005 | Chheda et al. ................. | 712/209 |
| 2005/0273631 | A1 | 12/2005 | Shu et al. | |
| 2006/0056622 | A1* | 3/2006 | Liardet et al. .................. | 380/28 |
| 2006/0155962 | A1* | 7/2006 | Piry ................................ | 712/214 |
| 2008/0141340 | A1 | 6/2008 | Ohyama | |
| 2008/0215874 | A1* | 9/2008 | Dale et al. ...................... | 713/2 |
| 2010/0223434 | A1* | 9/2010 | Dupaquis et al. ............. | 711/154 |
| 2012/0036371 | A1* | 2/2012 | Hayek ........................... | 713/190 |

FOREIGN PATENT DOCUMENTS

| | | |
|---|---|---|
| JP | 2001-005731 | 1/2001 |
| JP | 2004-056363 | 2/2004 |

(Continued)

OTHER PUBLICATIONS

Ambrose et al. (A Smart Random Code Injection to Mask Power Analysis Based Side Channel Attacks); Proceeding Codes+ISSS '07 Proceedings of the 5th IEEE/ACM international conference on Hardware/software codesign and system synthesis; 2007; pp. 51-56.*

(Continued)

*Primary Examiner* — Keith Vicary (74) *Attorney, Agent, or Firm* — Staas & Halsey LLP (57) ABSTRACT

An arithmetic processing apparatus includes an operation circuit group that performs encryption and a redundant operation circuit group configured the same as the operation circuit group. The arithmetic processing apparatus, while performing encryption, performs normal encryption in the operation circuit group, and performs an encryption mask processing program by using data and the like randomly generated by a random data generating unit and the like in the redundant operation circuit group. The arithmetic processing apparatus, when not performing encryption, performs normal arithmetic processing in the redundant operation circuit group.

8 Claims, 5 Drawing Sheets

FOREIGN PATENT DOCUMENTS

| | | |
|---|---|---|
| JP | 2005-223477 | 8/2005 |
| JP | 3933647 | 3/2007 |
| JP | 2009-543487 | 12/2009 |
| WO | WO 2008/006755 | 1/2008 |

OTHER PUBLICATIONS

Japanese Office Action for Application No. 2011-508116 mailed Aug. 21, 2012.

* cited by examiner

PROCESSOR FOR PERFORMING ENCRYPTION MASK PROCESSING USING RANDOMLY GENERATED INSTRUCTIONS AND DATA

CROSS-REFERENCE TO RELATED APPLICATION

This application is based upon and claims the benefit of priority of the prior Japanese Patent Application No. 2008-171214, filed on Jun. 30, 2008, the entire contents of which are incorporated herein by reference.

FIELD

Embodiments discussed herein are directed to an arithmetic processing apparatus that executes encryption.

BACKGROUND

Countless incidents and problems related to security such as exploitation of information being decrypted and illegal impersonation of a particular individual have become social issues. Accordingly, both individuals and companies need to take measures against information leakage, and encryption of information and secrets have become a must.

The main stream of information encryption is to provide resistance to decryption, by adopting methods such as a Data Encryption Standard (DES), an Advanced Encryption Standard (AES), a Rivest Shamir Adleman (RSA) public-key cryptosystem, and Mitsubishi Improved Security Technology (MISTY) (common key cryptosystem), and increasing computational complexity of decryption. To increase the computational complexity of decryption, methods have been considered, such as a method of increasing the encryption key size and a method of increasing the number of times of arithmetic operations.

Figure 8:
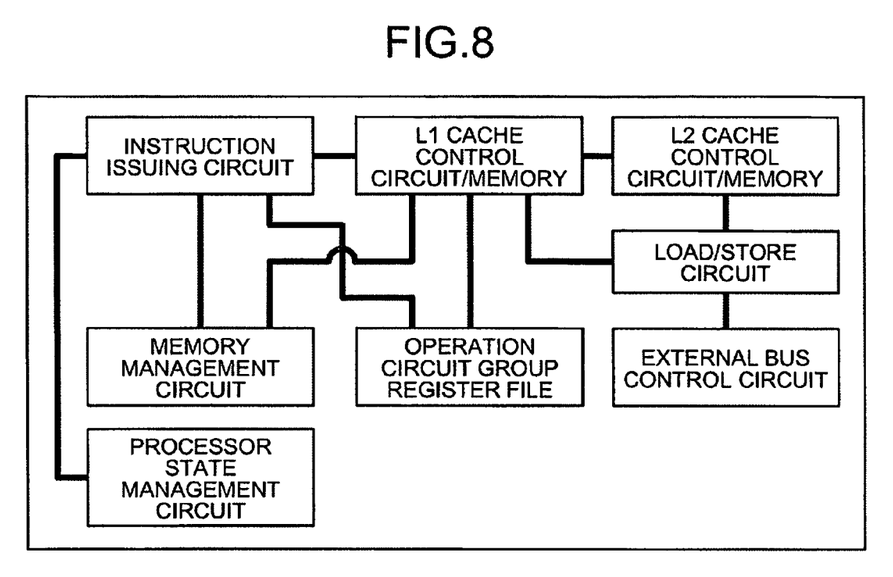
FIG. 8 is a schematic for explaining a conventional technology.

In recent years, as a method of specifying an encryption method from hardware, the decryption has been performed to specify the type, the number of times, and the contents of the arithmetic operation, from the power distribution and the amount of power fluctuations on a chip of the processor that performs encryption, as depicted in FIG. 8. More specifically, one such method is Differential Power Analysis (DPA) that specifies a secret key used for encryption, by analyzing power consumption during encryption performed by a microcomputer. The power consumption analyzed by the DPA can generally be measured, by providing resistance between Vcc and GND on a processor chip, and observing the voltage at the both ends.

Technologies are disclosed that prevent decryption such as the DPA, by controlling power consumed by hardware in a system and by averaging power consumed by the whole system, using the number of times the serial data has changed. Such technologies are disclosed in, for example, Japanese Laid-open Patent Publication No. 2004-56363 and Japanese Patent No. 3933647. Similarly, technologies are disclosed that prevent decryption, by reducing the correlation between power consumption and encrypted data by adding random data to the data that transmits on a bus and transferring the data, and by making a processor randomly execute instructions. Such technologies are disclosed in, for example, Japanese Laid-open Patent Publication No. 2005-223477 and United States Patent Application Publication No. 2005/0273631.

All the conventional technologies described above try to increase the strength of encryption by increasing the computational complexity. However, if the movement of hardware itself is decrypted, the encryption algorithm is known. This poses a problem of reducing the encryption strength.

More specifically, even if the power consumed in the entire system is averaged by controlling the power consumed by the hardware in the system, as in these days, if a target of attack is a processor main body, or an individual hardware module in the computer, this is not effective. Even if the power consumed in the entire system is averaged, by producing serial data corresponding to the number of times that the serial data does not change and by entering the data in a dummy circuit identical to an encryption processing circuit, other encryption using data other than the serial data also exists. Accordingly, the applicable range is limited and it is not effective as a countermeasure to analyze power consumed in encrypting general parallel data.

Even if the power consumption analysis is made difficult, by reducing the correlation between power consumption and encrypted data, by adding random data to the data transmitted on a bus and transferring the data, if the power consumption is analyzed from an internal component of a microprocessor and the like, it is not effective. Even if a processor randomly executes instructions, by setting a particular control flag, before and after the encryption program, the instructions are not randomly executed during encryption. Accordingly, it is not effective when power consumption is analyzed.

SUMMARY

According to an aspect of the invention, an arithmetic processing apparatus includes a first operation unit that performs an encryption; and a second operation unit that, while the first operation unit performs the encryption, performs a mask processing program using at least one of randomly generated instruction and data, and while the first operation unit does not perform the encryption, performs a normal arithmetic operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be explained with reference to accompanying drawings. In the following, an outline of the arithmetic processing apparatus according to the embodiments, and a configuration and a processing flow of the arithmetic processing apparatus are sequentially described, and then various modifications of the embodiments will be described.

"Encryption" as used herein is intended to encompass not only processing for encryption but also processing for decryption.

[a] First Embodiment

Outline of Arithmetic Processing Apparatus

An outline of an arithmetic processing apparatus according to a first embodiment of the present invention will now be described. The arithmetic processing apparatus according to the first embodiment is a microprocessor that includes an operation circuit group, a redundant operation circuit group, and a random data generating circuit. The operation circuit group performs encryption. The redundant operation circuit group has the same configuration as that of the operation circuit group. The random data generating circuit loads randomly generated data into each circuit of the redundant operation circuit group. With these, it is possible to firmly prevent decryption. The operation circuit group includes a plurality of circuits such as an integer/floating-point arithmetic circuit, a logic operation circuit, a shift register, and a Bit Population count circuit that are often used for encryption.

More specifically, the arithmetic processing apparatus (microprocessor) according to the first embodiment, while performing encryption, processes normal encryption in the operation circuit group, and performs a redundant encryption mask processing program using randomly generated data, in the redundant operation circuit group. By performing such an encryption mask processing program, the arithmetic processing apparatus can generate redundant power consumption to the difference in power between when power is consumed and when power is not consumed. Accordingly, the arithmetic processing apparatus can mask the power consumption fluctuations caused by actual encryption performed in the operation circuit group, and prevent a cryptanalyst from detecting a temporal and spatial localization of the power consumption. As a result, the cryptanalyst cannot analogize from the power consumption by using the Differential Power Analysis (DPA) and the like, and for example, cannot make assumptions on the type of encryption operation and the number of times the arithmetic operation is performed. Accordingly, the arithmetic processing apparatus can firmly prevent decryption.

Configuration of Arithmetic Processing Apparatus

Figure 1:
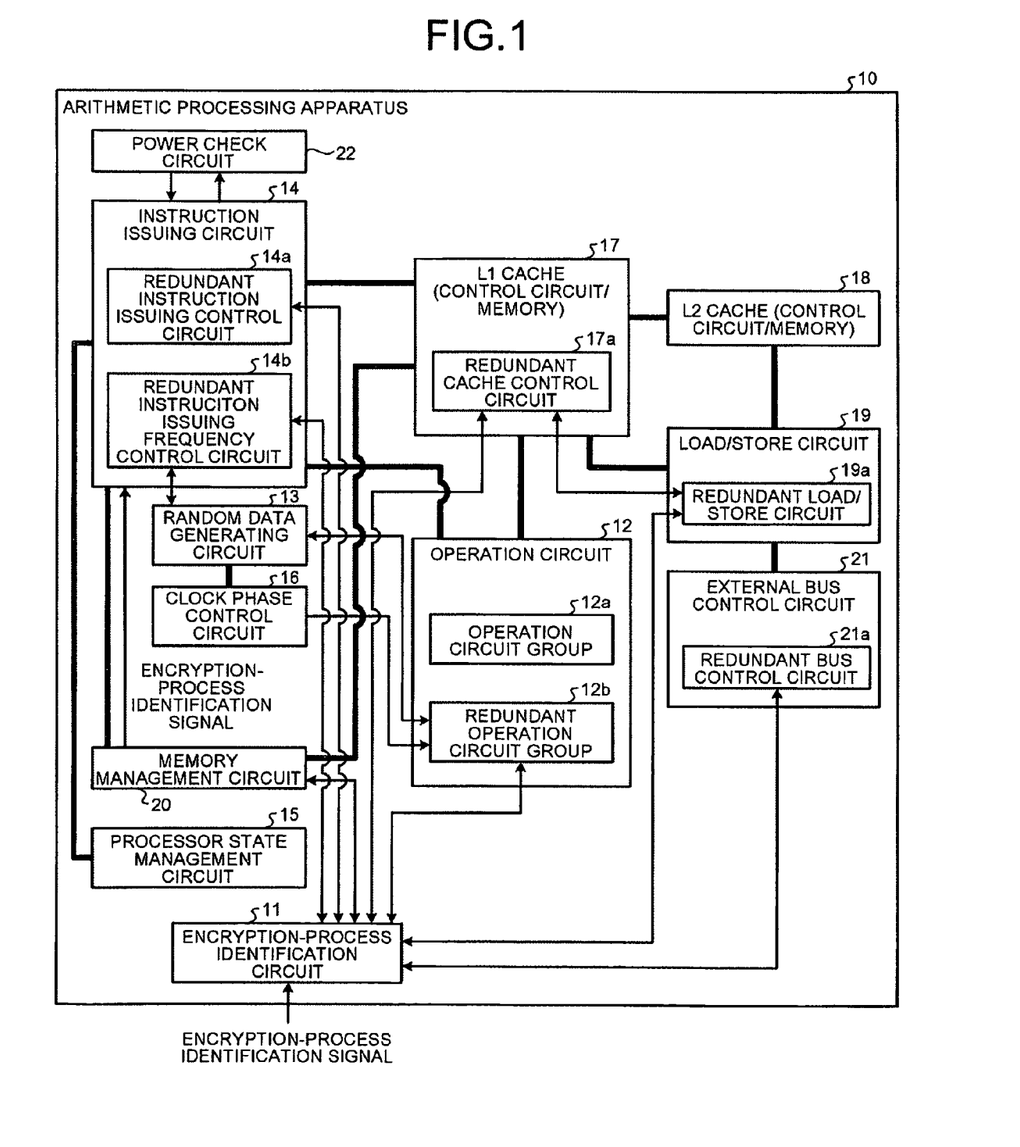
FIG. 1 is a block diagram of an arithmetic processing apparatus according to a first embodiment of the present invention.

With reference to FIGS. 1 to 6, a configuration of the arithmetic processing apparatus according to the first embodiment will be described. FIG. 1 is a block diagram of the arithmetic processing apparatus according to the first embodiment.

As depicted in FIG. 1, an arithmetic processing apparatus 10 according to the first embodiment includes an encryption identification circuit 11, an operation circuit 12, a random data generating circuit 13, an instruction issuing circuit 14, a processor state management circuit 15, a clock phase control circuit 16, an L1 cache 17, an L2 cache 18, a Load/Store circuit 19, a memory management circuit 20, an external bus control circuit 21, and a power check circuit 22.

The encryption identification circuit 11 identifies whether the arithmetic processing apparatus (microprocessor) 10 is performing encryption, and notifies each functional unit. More specifically, the encryption identification circuit 11, from an encryption identification signal received from outside, a process ID in a computer program, or the like, identifies whether the computer program performs encryption. The encryption identification circuit 11 then outputs the identified result to the operation circuit 12, the instruction issuing circuit 14, the L1 cache 17, the Load/Store circuit 19, and the external bus control circuit 21 being connected. The encryption identification signal received from outside may be generated in the microprocessor or may be generated in an external device. However, the encryption identification circuit 11 needs to recognize what sort of encryption identification signal is used for encryption. For example, the encryption identification signal can be identified by providing in advance a branching circuit (determination circuit) that detects a certain signal (encryption identification signal) or information from MMU table lookup results and the like, in the encryption identification circuit 11.

Figure 2:
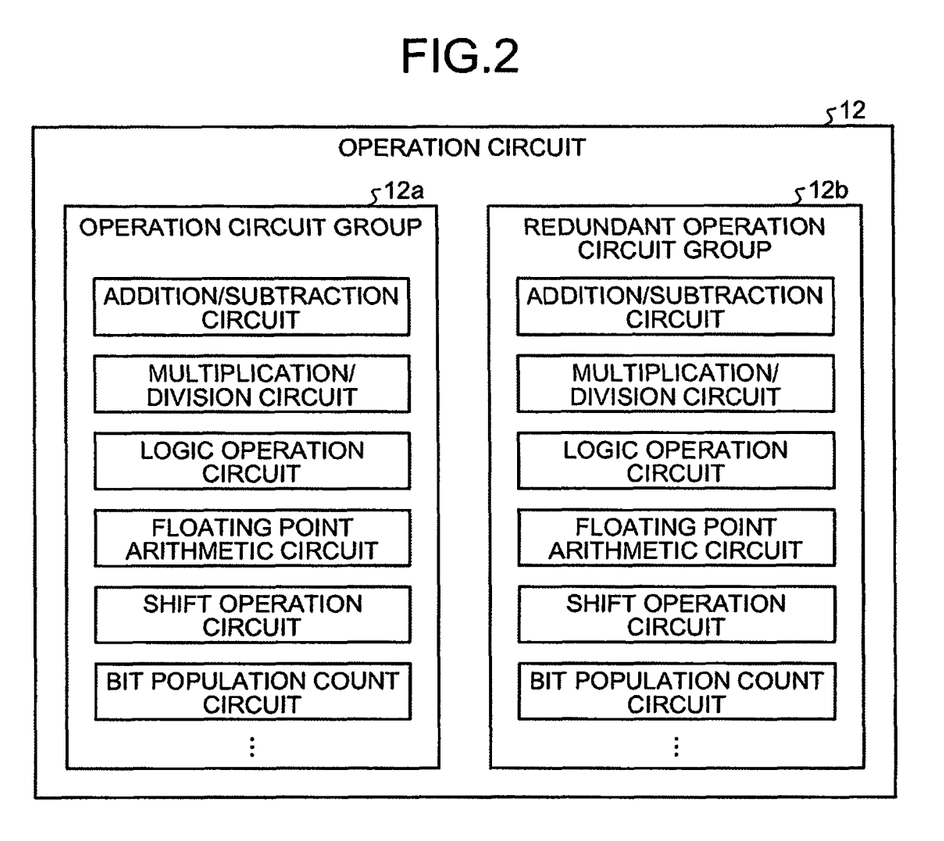
FIG. 2 is a schematic for explaining an operation circuit depicted in FIG. 1.

The operation circuit 12 is a circuit that includes an Integer Unit (IU) and a Floating Point Unit (FPU). The operation circuit 12 includes a register file that stores therein the arithmetic result, a plurality of circuits that perform encryption, and a redundant operation circuit that performs a redundant encryption mask processing program using data randomly generated by the random data generating circuit, which will be described later. More specifically, the operation circuit 12, as depicted in FIG. 2, includes an operation circuit group 12a and a redundant operation circuit group 12b. The operation circuit group 12a includes an addition/subtraction circuit, a multiplication/division circuit, a logic operation circuit, a floating-point arithmetic circuit, a shift operation circuit, and a Bit Population count circuit, etc. The redundant operation circuit group 12b has the same circuit configuration as that of the operation circuit group 12a.

When the operation circuit group 12a is notified that encryption is being performed from the encryption identification circuit 11 or the memory management circuit 20, and various arithmetic instructions to be performed during encryption are entered from the instruction issuing circuit 14, which will be described later, the operation circuit group 12a obtains data from the L1 cache 17 and/or the L2 cache 18, and executes the processes corresponding to the instructions in various operation circuits. The operation circuit group 12a then stores the result obtained by execution in the L1 cache 17, the L2 cache 18, the Load/Store circuit 19, a main storage device (memory) connected to the external bus control circuit 21. The processing contents performed by various operation circuits included in the operation circuit group 12a will now be described. The addition/subtraction circuit is a circuit that includes an adder and a subtractor, and adds or subtracts various data. The multiplication/division circuit is a circuit that includes a multiplier and a divider, and multiplies or divides various data. The logic operation circuit is a circuit that performs Boolean algebra (logic arithmetic) such as a logical addition and a logical multiplication.

The floating-point arithmetic circuit is a circuit that calculates floating point numbers. The shift operation circuit is a circuit that performs shifting such as an arithmetic shift and a logical shift, and operates a bit. The Bit Population count circuit is a circuit that counts the bits indicating a value of 1 or 0 in a register. The various operation circuits described above are examples, and the operation circuit group 12a may include other circuits often used for encryption other than these. The operation circuit group 12a does not need to include all of the various operation circuits, and some may be performed by software.

The redundant operation circuit group 12b has the same configuration as that of the operation circuit group 12a. When encryption is performed, the redundant operation circuit group 12b performs encryption by using randomly generated data, and when encryption is not performed, the redundant operation circuit group 12b performs the other arithmetic processing. More specifically, when notified that encryption is being performed from the encryption identification circuit 11 or the memory management circuit 20, while responding to a clock applied from the clock phase control circuit 16, which will be described later, the redundant operation circuit group 12b operates various operation circuits by using data randomly generated by the random data generating circuit 13, which will be described later. The redundant operation circuit group 12b is notified that encryption is being performed, receives an instruction randomly generated by a redundant instruction issuing control circuit 14a of the instruction issuing circuit 14, which will be described later, and operates various operation circuits based on the instruction and random data. The redundant operation circuit group 12b then stores the result obtained by execution in a dedicated region of the redundant operation circuit group 12b such as the L1 cache 17, the L2 cache 18, the Load/Store circuit 19, and a main storage device connected to the external bus control circuit 21.

When notified that encryption is not being performed, in other words, that the other arithmetic processing is being performed, from the encryption identification circuit 11 or the memory management circuit 20, the redundant operation circuit group 12b executes the other arithmetic processing that should be executed at this time, using various operation circuits. The redundant operation circuit group 12b stores the result obtained by execution in the dedicated region of the redundant operation circuit group 12b, such as the L1 cache 17, the L2 cache 18, the Load/Store circuit 19, the main storage device connected to the external bus control circuit 21. Similar to the operation circuit group 12a, the redundant operation circuit group 12b may include circuits often used for encryption other than the operation circuits described above. The redundant operation circuit group 12b does not need to include all of the various operation circuits described above, and some may be performed by software. Because the processing contents performed by the various operation circuits included in the redundant operation circuit group 12b are the same as the processing contents described for the operation circuit group 12a, the detailed descriptions thereof will be omitted. FIG. 2 is a schematic for explaining the operation circuit.

Figure 3:
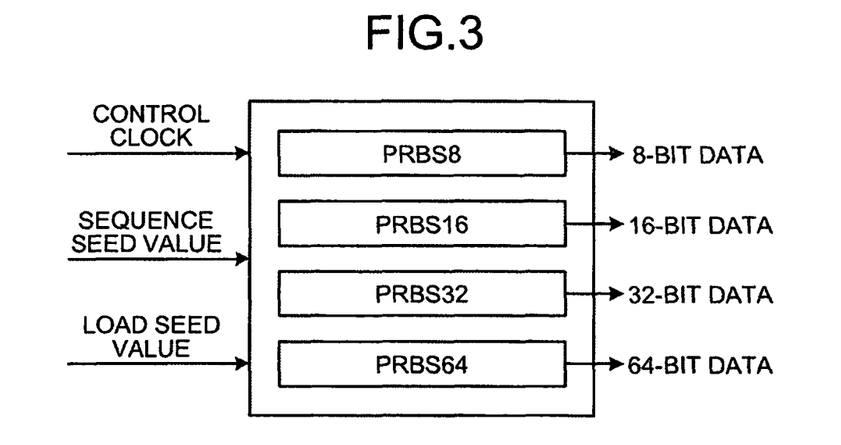
FIG. 3 is a schematic for explaining a random data generating circuit depicted in FIG. 1.

Referring back to FIG. 1, the random data generating circuit 13 is a circuit that generates random data and loads the data into the redundant operation circuit group 12b of the operation circuit 12. More specifically, the random data generating circuit 13, as depicted in FIG. 3, generates pseudo random numbers by using pseudo random binary (bit) sequences (PRBSs) that correspond to 8 bits, 16 bits, 32 bits, and 64 bits, and generates random data. For example, the random data generating circuit 13 generates random numbers (8-bit data, 16-bit data, 32-bit data, or 64-bit data) by a specific operation, by entering a control clock, a sequence seed value (initial value), and a seed value in any one of the PRBSs, and loading the generated data into the redundant operation circuit group 12b of the operation circuit 12. FIG. 3 is a schematic for explaining the random data generating circuit.

Referring back to FIG. 1, the instruction issuing circuit 14 is a circuit that issues various processor instructions which includes arithmetic instructions and memory access instructions, etc. into each circuit. As those closely related to the present embodiment, the instruction issuing circuit 14 includes the redundant instruction issuing control circuit 14a and a redundant instruction issuing frequency control circuit 14b. More specifically, the instruction issuing circuit 14, based on a control clock loaded from the encryption identification circuit 11 and the like, in other words, a clock and an instruction issuing control signal generated in the arithmetic processing apparatus 10, generates an instruction to perform encryption, and various control and information signals, and loads such instruction and signals into the operation circuit 12. For example, the instruction issuing circuit 14 reads and decodes an instruction from the main storage device connected to the external bus control circuit 21, via the memory management circuit 20, the L1 cache 17, the L2 cache 18, and the Load/Store circuit 19, which will be described later. If the decoded instruction is an arithmetic instruction or the like, the instruction issuing circuit 14 loads the arithmetic instruction into the operation circuit 12. If the decoded instruction is an access instruction to the memory or the like, the instruction issuing circuit 14 transfers data between the memory and the operation circuit 12 or the register file, using the memory management circuit 20, the Load/Store circuit 19, the L2 cache 18, the L1 cache 17, and the external bus control circuit 21.

Figure 4:
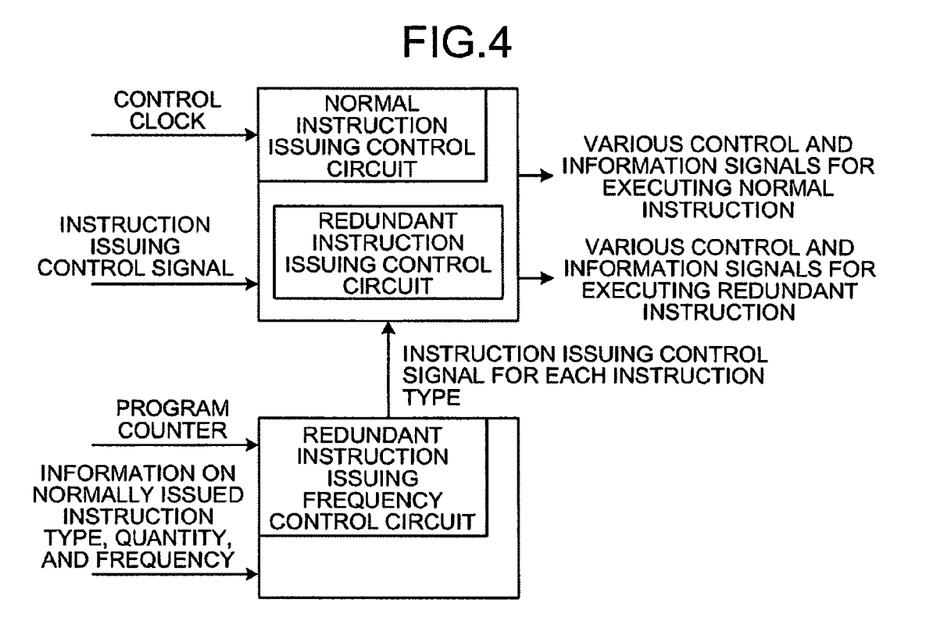
FIG. 4 is a schematic for explaining an instruction issuing circuit depicted in FIG. 1.

The redundant instruction issuing control circuit 14a, while performing encryption, loads a randomly generated instruction into the redundant operation circuit group 12b of the operation circuit 12. More specifically, when notified that encryption is being performed from the encryption identification circuit 11, the redundant instruction issuing control circuit 14a, as depicted in FIG. 4, receives an instruction issuing control signal for each instruction type, from the redundant instruction issuing frequency control circuit, which will be described later. The redundant instruction issuing control circuit 14a then randomly generates instructions (various control and information signals) to perform an encryption mask processing program, and loads the instructions into the redundant operation circuit group 12b of the operation circuit 12.

The redundant instruction issuing frequency control circuit 14b recognizes an execution program and an execution phase during encryption, and when the program or the phase to be executed changes, operates the redundant operation circuit group 12b. More specifically, the redundant instruction issuing frequency control circuit 14b, as depicted in FIG. 4, recognizes the execution program and the execution phase during encryption, by receiving a program counter and instruction information such as the type, the quantity, and the frequency from the processor state management circuit 15, which will be described later. The redundant instruction issuing frequency control circuit 14b, when the program or the phase to be executed changes, directs the redundant instruction issuing control circuit 14a to issue instructions to counteract program or phase change which is the change of frequency of instruction executions. The redundant instruction issuing control circuit 14a is indicated to issue an instruction, randomly generates instructions (various control and information signals) to perform an encryption mask processing program, and loads the instructions into the redundant operation circuit group 12b of the operation circuit 12. In this manner, it is possible to randomly change the transition portion of the program and phase to be executed, thereby preventing a cryptanalyst from detecting a temporal and spatial localization of the power consumption.

The redundant instruction issuing frequency control circuit 14b, when the power consumption measured by the power check circuit 22, which will be described later, is greater than a predetermined threshold, suppresses the instruction from being loaded into the redundant operation circuit group 12b. More specifically, the redundant instruction issuing frequency control circuit 14b, on receiving a notification that the power consumption in the arithmetic processing apparatus is a value close to the maximum acceptable value from the power check circuit 22, loads an instruction issuing suppression signal into the redundant instruction issuing control circuit 14a, and suppresses the instruction to the redundant operation circuit group 12b. FIG. 4 is a schematic for explaining the instruction issuing circuit.

Referring back to FIG. 1, the processor state management circuit 15 recognizes a computer program and a phase executed in encryption from an execution history of encryption. For the computer program or phase whose the number of instruction execution in predetermined timeframe has increased or decreased during encryption, the processor state management circuit 15 loads instructions randomly generated to counteract the increase or the decrease into the redundant operation circuit group 12b of the operation circuit 12. More specifically, the processor state management circuit 15 stores an execution phase and the like of each encryption program executed in the past or immediately before, in a temporary region and the like. Then, while the operation circuit 12 is performing encryption after being notified that encryption is being performed from the encryption identification circuit 11, the processor state management circuit 15 obtains a computer program and a phase being executed from the encryption identification circuit 11 and the operation circuit 12, and loads such computer program and phase into the redundant instruction issuing frequency control circuit 14b. The processor state management circuit 15, on judging that only a few arithmetic operations is executed in the operation circuit 12 in the recognized phase and the like from the execution history, directs the redundant instruction issuing frequency control circuit 14b to issue an instruction. The redundant instruction issuing frequency control circuit 14b directed to issue instructions, then directs the redundant instruction issuing control circuit 14a to issue instructions. The redundant instruction issuing control circuit 14a then randomly generates instructions (various control and information signals) and loads the instructions into the redundant operation circuit group 12b of the operation circuit 12.

Figure 5:
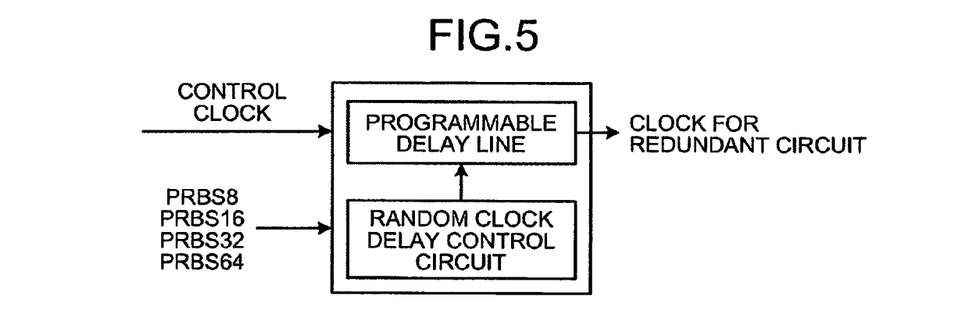
FIG. 5 is a schematic for explaining a clock phase control circuit depicted in FIG. 1.

The clock phase control circuit 16 controls phase fluctuations of a clock provided in the redundant operation circuit group 12b of the operation circuit 12. More specifically, the clock phase control circuit 16, as depicted in FIG. 5, receives random data generated by the random data generating circuit 13 and a control clock generated in the arithmetic processing apparatus 10 as an input signal. The clock phase control circuit 16 then delays the input signal for a certain period of time, by using a random clock delay control circuit, a programmable delay line, and the like, generates a clock whose phase is fluctuated, and outputs the generated clock to the redundant operation circuit group 12b of the operation circuit 12. For example, the clock phase control circuit 16 may decide the delay time corresponding to the type of random data, generate a clock by delaying input signal for a certain period of time corresponding to the random data, using the random clock delay control circuit, the programmable delay line, and the like, and output the generated clock to the redundant operation circuit group 12b of the operation circuit 12. FIG. 5 is a schematic for explaining the clock phase control circuit.

The L1 cache 17 includes a control circuit, a memory, and a redundant cache control circuit 17a. The L1 cache 17 sends an instruction or data upon request from the instruction issuing circuit 14 and the operation circuit group 12a of the operation circuit 12. More specifically, the memory of the L1 cache 17 is a memory of high speed and small capacity, integrated or mounted on the same module as that of the microprocessor, which is the arithmetic processing apparatus 10. The memory of the L1 cache 17 is also a temporary region that stores therein frequently used instructions and data.

The control circuit of the L1 cache 17, on receiving an acquisition request for an instruction or data from the instruction issuing circuit 14 and the operation circuit group 12a, determines whether the instruction or data corresponding to the acquisition request is stored in the memory of the L1 cache 17. The control circuit of the L1 cache 17, when the instruction or data corresponding to the acquisition request is stored in the memory of the L1 cache 17, obtains the corresponding instruction or data from the memory of the L1 cache 17 and responds thereto. When the instruction or data corresponding to the acquisition request is not stored in the memory of the L1 cache 17, the control circuit of the L1 cache 17 obtains the corresponding instruction or data from the main storage connected to the external bus control circuit 21, via the L2 cache 18 and the Load/Store circuit 19, which will be explained later, and responds thereto.

The redundant cache control circuit 17a of the L1 cache 17, on receiving an acquisition request for an instruction or data from the instruction issuing circuit 14 or the redundant operation circuit group 12b, imitates an operation of responding to the instruction or data corresponding to the acquisition request. For example, the redundant cache control circuit 17a of the L1 cache 17 imitates an operation of determining whether the instruction or data corresponding to the acquisition request is stored in the memory of the L1 cache 17, and an operation of obtaining the corresponding instruction or data from the main storage connected to the external bus control circuit 21 via the L2 cache 18 and the Load/Store circuit 19, and responds to the instruction issuing circuit 14 or the redundant operation circuit group 12b.

The L2 cache 18 includes a control circuit and a memory, and sends an instruction and data upon a request from the L1 cache 17. More specifically, the memory of the L2 cache 18 is slower in speed than the memory of the L1 cache 17, and faster in speed than the main storage. The memory of the L2 cache 18 is larger in capacity than the memory of the L1 cache 17, and smaller in capacity than the main storage unit. The memory of the L2 cache 18 is also a temporary region that stores therein relatively frequently used data.

The control circuit of the L2 cache 18, on receiving an acquisition request for an instruction or data from the L1 cache 17, determines whether the instruction or data corresponding to the acquisition request is stored in the memory of the L2 cache 18. The control circuit of the L2 cache 18, when the instruction or data corresponding to the acquisition request is stored in the memory of the L2 cache 18, obtains the corresponding instruction or data from the memory of the L2 cache 18, and responds thereto. When the instruction or data corresponding to the acquisition request is not stored in the memory of the L2 cache 18, the control circuit of the L2 cache 18 obtains the corresponding instruction or data from the main storage connected to the external bus control circuit 21 via the Load/Store circuit 19, which will be described later, and responds thereto.

The Load/Store circuit 19 includes a redundant Load/Store circuit 19a, and executes Load or Store instructions for the L1 cache 17, the L2 cache 18, the main storage connected to the external bus control circuit 21, and the like. More specifically, when a Load instruction is received from the L1 cache 17 and the L2 cache 18, the Load/Store circuit 19 obtains data corresponding to the instruction from the main storage connected to the external bus control circuit 21, and stores the data in a memory of an instruction source. When a Store instruction is received from the L1 cache 17 and the L2 cache 18, the Load/Store circuit 19 reads data corresponding to the instruction from the memory of the instruction source, and stores in the main storage connected to the external bus control circuit 21.

The redundant Load/Store circuit 19a of the Load/Store circuit 19 imitates an operation of executing the Load or Store instructions with respect to the L1 cache 17, the L2 cache 18, the main storage connected to the external bus control circuit 21, and the like. For example, when a Load instruction is received from the redundant cache control circuit 17a of the L1 cache 17 and the L2 cache 18, the redundant Load/Store circuit 19a imitates an operation of obtaining data corresponding to the instruction from the main storage connected to the external bus control circuit 21, and storing the data in the memory of the instruction source. When a Store instruction is received from the L1 cache 17 and the L2 cache 18, the redundant Load/Store circuit 19a imitates an operation of reading data corresponding to the instruction from the memory of the instruction source, and storing the data in the main storage connected to the external bus control circuit 21.

The memory management circuit 20 processes memory access controls. More specifically, the memory management circuit 20 includes a function to convert a virtual address to a physical address, a memory protection function, and a cache control function.

The external bus control circuit 21 includes a redundant bus control circuit 21a, and controls data exchange with the main storage that is an external device. More specifically, when a Load instruction, data corresponding to the instruction, and the like, are received from the main storage via the external bus control circuit 21, then responds to the Load/Store circuit 19. When a Store instruction is received from the Load/Store circuit 19, data corresponding to the instruction, and the like are received from the Load/Store circuit 19 and the external bus control circuit 21 stores the data and the like in the main storage.

The redundant bus control circuit 21a imitates the control of data exchange with the main storage, which is an external device. More specifically, when a pseudo Store instruction that is an imitated operation, data corresponding to the instruction, and the like, are received from the redundant Load/Store circuit 19a, the redundant bus control circuit 21a imitates the operation of storing the data and the like in the main storage. When a pseudo Load instruction is received from the Load/Store circuit 19, the redundant bus control circuit 21a imitates an operation of obtaining data corresponding to the Store instruction from the main storage, and responding to the Load/Store circuit 19.

The redundant bus control circuit 21a, if the memory is not accessed during encryption, randomly accesses various memories. More specifically, if the memory is not accessed during encryption, for example, when a Load instruction and a Store instruction are not received for a certain period of time, the redundant bus control circuit 21a randomly accesses the memories of the L1 cache 17 and the L2 cache 18 via the redundant Load/Store circuit 19a, and randomly accesses the main storage being connected.

Figure 6:
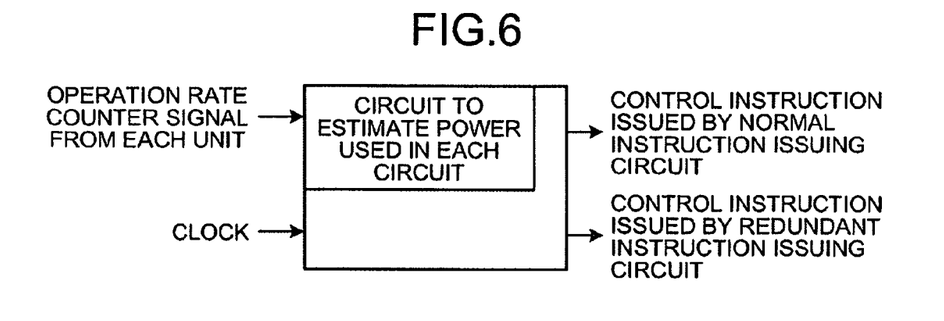
FIG. 6 is a schematic for explaining a power check circuit depicted in FIG. 1.

The power check circuit 22 measures power consumed by the entire arithmetic processing apparatus 10. More specifically, the power check circuit 22, as depicted in FIG. 6, from an operation rate counter signal received from each functional circuit via the instruction issuing circuit 14 and the control clock of the arithmetic processing apparatus 10, estimates power used in each circuit, and compares the total with a threshold. The power check circuit 22, if the calculated power consumed by the entire arithmetic processing apparatus 10 is equal to or greater than the threshold, in other words, if it is close to the maximum acceptable value of the power consumption, sends an instruction issuing suppression signal into the redundant instruction issuing frequency control circuit 14b.

The power check circuit 22, not only determines whether the power consumed by the entire arithmetic processing apparatus 10 is equal to or greater than a threshold, but can also determine whether the power consumed by each circuit is equal to or greater than a threshold, by providing a threshold of power consumption for each circuit. The power check circuit 22 can use various methods for estimating power. For example, it can estimate a changing probability of output signals from the changing probability of input signals for each circuit, and estimate power to be consumed by the entire circuit, from a product of a wiring capacity and the changing probability of each circuit. FIG. 6 is a schematic for explaining the power check circuit.

Processing Performed by Arithmetic Processing Apparatus

Figure 7:
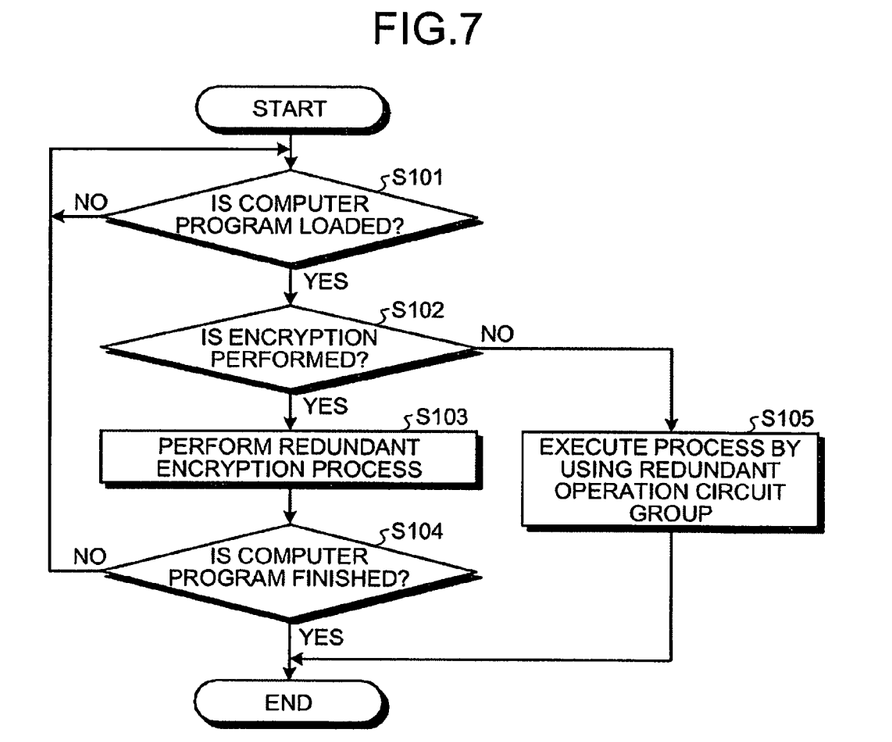
FIG. 7 is a flowchart of a processing flow performed by the arithmetic processing apparatus depicted in FIG. 1.

With reference to FIG. 7, processing performed by the arithmetic processing apparatus will be described. FIG. 7 is a flowchart of a processing flow performed by the arithmetic processing apparatus according to the first embodiment.

As depicted in FIG. 7, when a computer program is loaded (Yes at Step S101), the arithmetic processing apparatus 10 determines whether the computer program performs encryption (Step S102).

More specifically, the arithmetic processing apparatus 10, depending on whether a computer program ID that indicates encryption is included in an instruction issued from the encryption identification circuit 11 and the memory management circuit 20, determines whether the loaded computer program performs encryption.

The arithmetic processing apparatus 10, when the loaded computer program performs encryption (Yes at Step S102), performs redundant encryption (Step S103).

More specifically, the arithmetic processing apparatus 10, when the loaded computer program performs encryption, performs a redundant encryption mask processing program by operating a redundant circuit of the circuits and memories, while performing encryption by operating the circuits and memories explained in FIG. 2. The redundant circuit includes the redundant instruction issuing control circuit 14a, the redundant instruction issuing frequency control circuit 14b, the random data generating circuit 13, the redundant operation circuit group 12b, the redundant cache control circuit 17a, and the redundant Load/Store circuit 19a, and the redundant bus control circuit 21a.

The arithmetic processing apparatus 10, on finishing the computer program (Yes at Step S104), finishes the processing. When a new computer program is executed (No at Step S104), the arithmetic processing apparatus 10 returns to Step S101 and executes the subsequent processes.

When the loaded computer program does not perform encryption (No at Step S102), the arithmetic processing apparatus 10 executes the loaded computer program, by using a circuit of the circuits and memory and also a redundant circuit of the circuits and memories, at Step S105.

In this manner, with the first embodiment, the arithmetic processing apparatus 10 includes the operation circuit group 12a that performs encryption, and the redundant operation circuit group 12b that performs instruction execution by using randomly generated data when encryption is performed, and performs the other processing when encryption is not performed. Accordingly, the arithmetic processing apparatus 10 generates the redundant power consumption to the difference in power between when power is used and when power is not used. Subsequently, the arithmetic processing apparatus 10 masks fluctuations of the power consumption caused by actual encryption performed in the operation circuit group, and prevents a cryptanalyst from detecting a temporal and spatial localization of the power consumption. As a result, the arithmetic processing apparatus 10 can firmly prevent decryption.

With the first embodiment, the redundant operation circuit group 12b is one or a plurality of arithmetic units that has the same configuration as that of the operation circuit group 12a. As a result, the arithmetic processing apparatus 10 can generate more redundant power consumption to the difference in power between when power is used and when power is not used. Accordingly, it is possible to mask the power consumption fluctuations caused by the actual encryption performed in the operation circuit group even more.

With the first embodiment, when the redundant operation is performed by the redundant operation circuit group 12b, the arithmetic processing apparatus 10 only loads or stores the encryption result performed by the redundant operation circuit group 12b. When the other arithmetic processing is performed by the redundant operation circuit group 12b, the arithmetic processing apparatus 10 further includes a memory region to load or store the arithmetic processing result performed by the redundant operation circuit group 12b. As a result, by accessing a special space allocated for encryption, it is possible to prevent a normal memory space from having adverse effects.

With the first embodiment, when the memory is not accessed during encryption, the arithmetic processing apparatus 10 randomly accesses the memory region dedicated to the redundant operation circuit group 12b. As a result, it is possible to mask bias of the power consumption dependent on the usage frequency of the bus signal, thereby preventing decryption more firmly.

With the first embodiment, while performing encryption, the arithmetic processing apparatus 10 can load a randomly generated instruction into the redundant operation circuit group 12b. As a result, it is possible to randomly generate power consumption, thereby preventing decryption more firmly.

With the first embodiment, the arithmetic processing apparatus 10 recognizes the execution phase of each computer program performed by encryption from the execution history of encryption. With the execution phase that only executes a few arithmetic operations during encryption, the arithmetic processing apparatus 10 loads a randomly generated instruction into the redundant operation circuit group 12b. As a result, when the execution phase of the computer program changes, the arithmetic processing apparatus 10 randomly generates data with respect to the circuit whose frequency used in the execution phase has changed, and increases or decreases the frequency of generating and executing the redundant instruction to operate the redundant arithmetic unit and circuit. Accordingly, it is possible to reduce the difference in power consumption between phases, thereby averaging the power consumption.

With the first embodiment, when the measured power consumption is greater than a predetermined threshold, the arithmetic processing apparatus 10 suppresses the redundant operation circuit group 12b from loading an instruction. As a result, if a possibility rises that the power consumption may exceed the maximum power value, the arithmetic processing apparatus 10 can include a function to throttle the generation of the redundant instruction so as not to exceed the limit value. Accordingly, it is possible to prevent the apparatus from stopping, due to excess power consumption.

With the first embodiment, the arithmetic processing apparatus 10 can control the phase of the clock provided in the redundant operation circuit group 12b. As a result, the arithmetic processing apparatus 10 can shift the peak value of power consumption that can be viewed from outside from the timing of generating a normal peak value of power consumption.

[b] Second Embodiment

While the embodiments of the present invention have been described, it is to be understood that various other modifications may be made to the present invention. As described below, the different embodiments will now be described by dividing into (1) a configuration of redundant operation circuit group, (2) a configuration of memory, and (3) a configuration of system and the like.

(1) Configuration of Redundant Arithmetic Circuit Group

For example, in the first embodiment, the redundant operation circuit group 12b and the operation circuit group 12a have the same configuration. However, the arithmetic processing apparatus disclosed in the present invention is not limited to this, and it is possible to use the redundant operation circuit group 12b having the minimum configuration that can pseudo-execute encryption.

The redundant operation circuit group 12b mounts a remained portion of a chip. Accordingly, it is possible to ensure security during encryption without wasting power or a chip area, even if the circuit is a highly integrated large scale integration (LSI) or a very large scale integration (VLSI) being downsized and integrated.

(2) Configuration of Memory

In the first embodiment, a region dedicated to the redundant operation circuit group 12b is provided in the main storage connected to the external bus control circuit. However, the arithmetic processing apparatus disclosed in the present invention is not limited to this, and it is possible to connect a memory dedicated to the redundant operation circuit group 12b anew, to the external bus control circuit.

(3) Configuration of System and the Like

The arithmetic processing apparatus disclosed in the present invention does not need to include all the redundant circuits explained in the first embodiment. For example, the arithmetic processing apparatus may only include the redundant operation circuit group 12b and the random data generating circuit 13, or may only include the redundant operation circuit group 12b, the random data generating circuit 13, and the redundant instruction issuing circuit.

The respective constituents of the illustrated apparatuses are functionally conceptual, and need not necessarily be physically configured as illustrated. In other words, the specific mode of dispersion and integration of each apparatus is not limited to the ones depicted in the drawings, and all or a part thereof can be functionally or physically dispersed or integrated in an optional unit, depending on various kinds of load and the status of use (for example, by integrating the memory management circuit and the encryption identification circuit).

Of the processes described in the embodiments, all or a part of the processes as being described as automatically performed (such as encryption identification) may be manually performed. The information including the process procedure, the control procedure, specific names, and various kinds of data and parameter depicted in the specification or in the drawings can be optionally changed unless otherwise specified.

According to an embodiment of the present invention, it is possible to firmly prevent decryption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A processor comprising:
   a random instruction generating unit that generates a randomly generated instruction and data;
   a first operation unit that performs an encryption; and
   a second operation unit that performs a mask processing program by using the randomly generated instruction and the randomly generated data while the first operation unit performs the encryption, and performs a normal arithmetic operation while the first operation unit does not perform the encryption, wherein
   the random instruction generating unit, when the first operation unit performs the encryption, loads the randomly generated instruction into the second operation unit.

2. The processor according to claim 1, wherein the second operation unit includes at least an arithmetic unit that has a same or reduced configuration as that of the first operation unit.

3. The processor according to claim 1, further comprising:
   a memory unit that, when a mask processing program is performed by the second operation unit, only stores therein a result of the mask processing program performed by the second operation unit, and when the normal arithmetic operation is performed by the second operation unit, stores therein a result of arithmetic operation performed by the second operation unit.

4. The processor according to claim 3, further comprising:
   a memory accessing unit that, when a memory is not accessed during the mask processing program, randomly accesses the memory unit.

5. The processor according to claim 1, wherein the random instruction generating unit recognizes an execution phase of a computer program executed in the encryption from an execution history of the encryption, and if an operation frequency of the execution phase has changed during the encryption, loads an instruction by increasing or decreasing frequency of a random instruction into the second operation unit.

6. The processor according to claim 1, further comprising:
   a power consumption measuring unit that measures power consumed by an entire arithmetic processing apparatus, wherein
   the random instruction generating unit, when a power consumption measured by the power consumption measuring unit is greater than a predetermined threshold, suppresses an instruction from being loaded into the second operation unit.

7. The processor according to claim 1, further comprising:
   a clock phase control unit that controls a phase fluctuation of a clock provided in the second operation unit.

8. An arithmetic processing method for a processor including a first operation unit and a second operation unit, the arithmetic processing method comprising:
   generating a randomly generated instruction and data;
   performing a mask processing program by using the randomly generated instruction and the randomly generated data by the second operation unit while an encryption is performed by the first operation unit; and
   performing a normal arithmetic operation by the second operation unit while the encryption is not performed by the first operation unit, wherein
   the generating, when the first operation unit performs the encryption, includes loading the randomly generated instruction into the second operation unit.

* * * * *